(No Model.) 2 Sheets—Sheet 2.
G. M. SEARLE & G. N. SAEGMULLER.
RANGE FINDER.
No. 588,094. Patented Aug. 10, 1897.
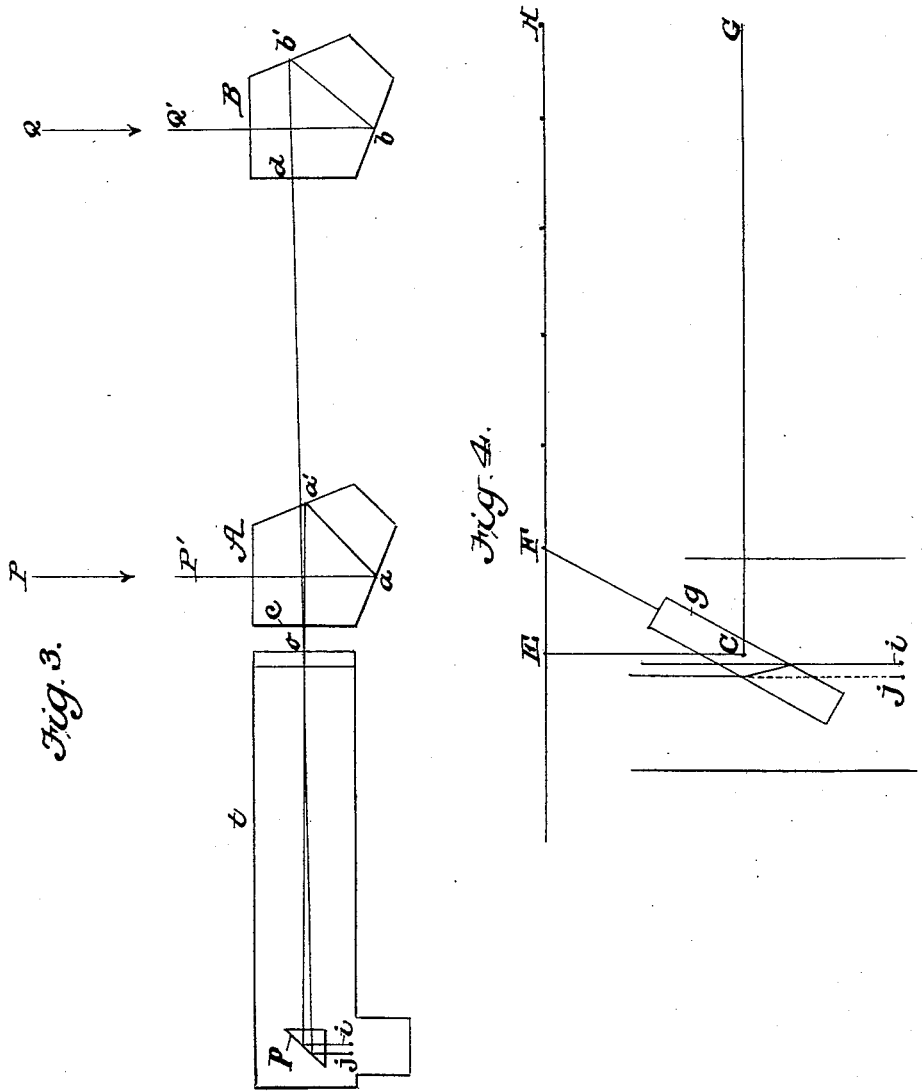
WITNESSES:
Jos. A. Ryan
Edw. W. Byrn
INVENTORS:
George M. Searle
George N. Saegmuller
BY Munn & Co.
ATTORNEYS.

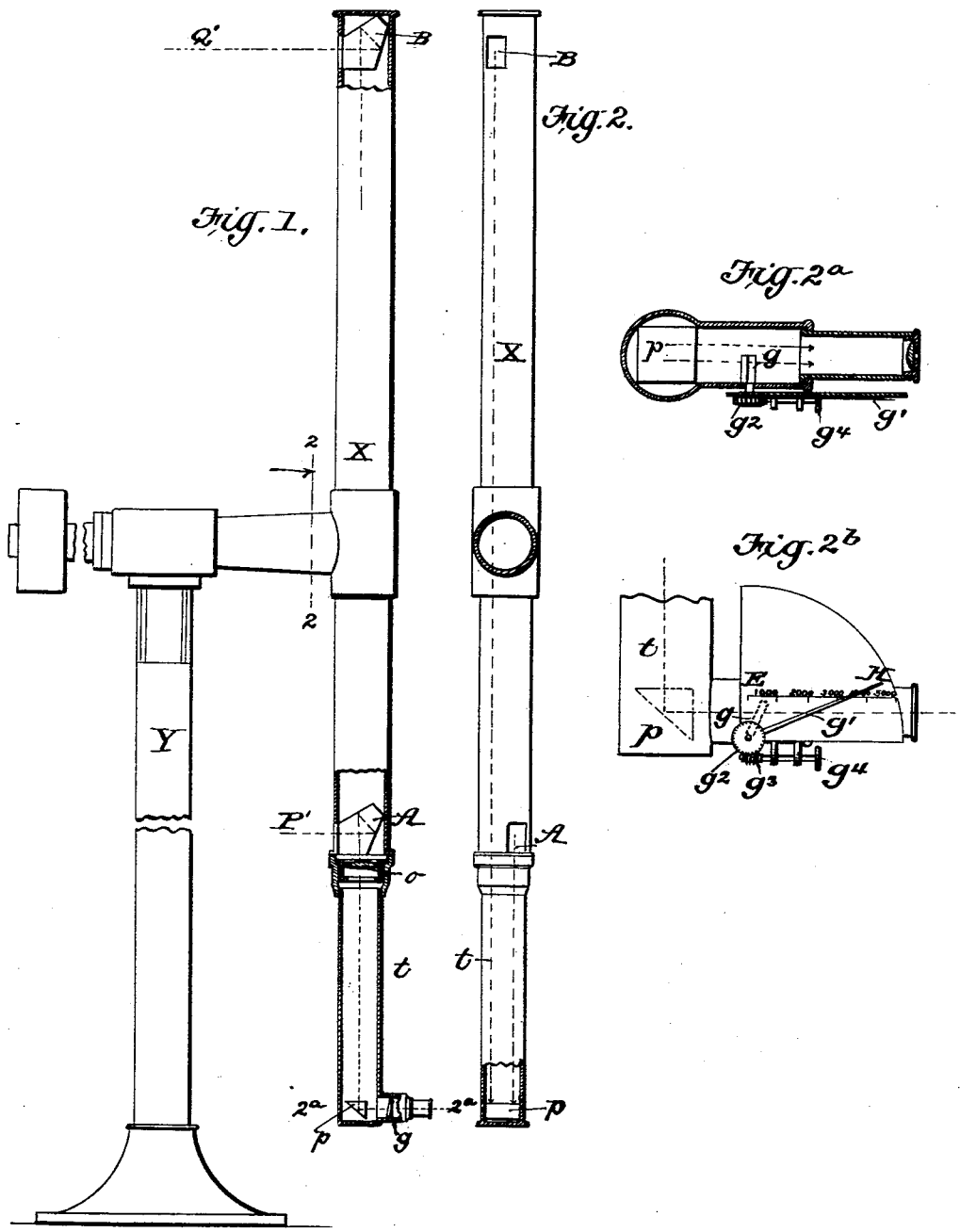

United States Patent Office.

GEORGE M. SEARLE AND GEORGE N. SAEGMULLER, OF WASHINGTON, DISTRICT OF COLUMBIA.

RANGE-FINDER.

SPECIFICATION forming part of Letters Patent No. 588,094, dated August 10, 1897.

Application filed April 12, 1897. Serial No. 631,756. (No model.)

*To all whom it may concern:*

Be it known that we, GEORGE M. SEARLE and GEORGE N. SAEGMULLER, of Washington, in the District of Columbia, have invented a new and useful Improvement in Range-Finders, of which the following is a specification.

The object of our invention is to provide an improved range-finder for use in measuring the distance of remote objects (such, for instance, as an enemy's vessel at sea) and indicating the said distance at once on a scale without calculation. In another application of even date herewith, marked "Case A," we have shown and described an instrument for the same purpose embodying somewhat similar principles.

The present improvement is intended to meet the requirement of measuring the distance from an observation-point aloft on the masthead and is organized to adapt it to use in this location.

It consists in the construction and arrangement of the parts of the instrument hereinafter shown and described, reference being had to the accompanying drawings, in which—

Figure 1 is a side elevation, partly in section; Fig. 2, a front elevation in section through line 2 2 of Fig. 1, looking in the direction of the arrow. Fig. $2^a$ is an enlarged horizontal section on line $2^a$ $2^a$ of Fig. 1, showing the internal arrangement of the eyepiece of the telescope. Fig. $2^b$ is a side view of the same parts. Fig. 3 is a diagram of the prisms and telescope; Fig. 4, a diagram of the adjustable refracting-plate for bringing the images into coincidence, shown in connection with the cotangent scale.

In the drawings, Figs. 1 and 2, X represents a tube from six to ten feet long and forming the base-line. This tube stands vertically and is hung about its middle upon a post or pillar Y, so that it may be carried on the platform at the masthead. In the top and bottom portions of the tube are lateral openings in which are set reflecting-prisms A and B, (or mirrors,) each adapted to receive the incident ray and send out the emergent ray at right angles to each other in a downward direction. We prefer for this purpose a double reflecting-prism, as shown in Fig. 3, for the reason that slight variation in its position does not interfere with the proper alinement of the emergent ray. These two prisms are arranged (see Fig. 2) in different planes, so that the rays from a remote object falling on one will be reflected to one-half of the object-glass of a telescope $t$, while the rays from the other will be thrown upon the other half of the object-glass without interference with each other. The telescope is fixed to the base-line tube X at one end in alinement with the same, and the eyepiece is on the side of the telescope, so that the direction of sight will be parallel to the incident rays on the prisms A B.

Referring now to the diagram Fig. 3, two pencils of rays P P' Q Q', proceeding from an object too far away to be represented in the figure, fall on the two prisms A and B. These prisms, being doubly reflecting with reflecting-surfaces $a$ $a'$ and $b$ $b'$, $a$ making an angle of forty-five degrees with $a'$ and $b$ with $b'$, send the pencils out at the faces $c$ and $d$, respectively, each ray being at an angle equal to ninety degrees from the original direction at which it left the object. These rays enter the object-glass $o$ of a telescope $t$ and proceed to a diagonal reflecting-prism $p$, (or mirror,) placed near the eyepiece, forming images $i j$ in the field of the eyepiece. As these pencils consist, sensibly or practically, of parallel rays, (the prisms being very small compared with the distance,) the images $i j$ will be separated by a distance having the same ratio to the focal length of the telescope that the distance between corresponding parts of the prisms A B has to the distance from either to the object.

The object now to be accomplished is the measurement of the distance $i j$, which varies reciprocally as the distance of the object observed. This can be done as follows: In the path of the pencil coming through one of the prisms—say B—a plate of glass $g$, Fig. 4, is interposed after or before it strikes the prism $p$. This plate has parallel sides, and its effect is to transfer laterally the axis of the pencil now approaching its focus at $j$, so that by more or less inclination of the plate it may come, by refraction, to a focus at $i$ instead of $j$, and thus produce coincidence of the two images formed by the prisms A and B in the field. This inclination varies with approximate uniformity to produce a uniform change in the distance by which the image is transferred, so that the amount of angular movement of the plate from a position perpendicular to the rays is approximately inversely proportional to the distance of the object observed, since this distance is to the base as the focal length of telescope is to the angular movement of the plate or angular movement = $\frac{\text{base} \times \text{focal length}}{\text{distance of object}}$, approximately. Now the inverse or reciprocal of an angle is approximately its cotangent, so that if C be the center around which the plate turns or revolves, C F the prolongation of its plane, C G the position of no inclination or transference when the ray strikes the plate perpendicularly and passes through undisturbed, and C E the perpendicular to C G, then the distance E F is proportional to the cotangent of the angle F C G or the inclination. A scale approximately of equal parts (which can be accurately computed by mathematical formulas if the thickness and index of refraction of the plate, the focal length of the telescope, and the length of the base are known) can therefore be laid off on E H, and on this scale a pointer fixed to and moving with plate $g$ will give the distance of the object by turning the plate $g$ until coincidence of the two images has been produced.

As shown in Figs. $2^a$ and $2^b$, this refracting-plate or coincidence-plate $g$ is provided with its pointer $g'$ operating across the cotangent scale E H. This pointer $g'$ is fixed to a worm-wheel $g^2$, and both are rigid with the axial rock-shaft that carries the glass plate $g$, and the adjustment of the inclination of the latter is effected by a worm $g^3$ and a shaft with milled head $g^4$. The value of this cotangent scale is that it practically gives the indications in equal parts irrespective of the distance of the object, and this is an important advantage, since without it the readings of the scale would get closer together as the distance of the object increased, for the greater the distance of the object in proportion to the base-line the closer the two images on the object-glass would appear, and hence a continually-smaller deflection of the plate $g$ would be required, which for long distances would jumble the graduations and figures together, so that they would not be easily legible. By the cotangent scale a continually-increased measurement on the line E H is made for each successive equal movement of the plate $g$ about its axis, so as to compensate for this crowding of the markings, and thus render the scale practically one of equal parts.

Having thus described our invention, what we claim as new, and desire to secure by Letters Patent, is—

A range-finder comprising a telescope, two reflecting-prisms separated, in fixed relation, a distance apart representing a base-line and arranged in different planes so that each sends its own rays upon a different portion of the object-glass of the telescope, an axially-adjustable refracting-plate for receiving the rays from one of the reflecting-prisms and bringing them into coincidence with the other rays of the other prism, a pointer fixed upon the adjustable refracting-plate, and a cotangent scale of equal parts for marking equal spaces for variable distances substantially as and for the purpose described.

GEORGE M. SEARLE.
GEORGE N. SAEGMULLER.

Witnesses:
EDW. W. BYRN,
SOLON C. KEMON.